April 4, 1950   F. WALLER   2,503,083
APPARATUS FOR CONTROLLING PICTURE
DISPLAYS FROM SOUND RECORDS
Filed Feb. 15, 1947
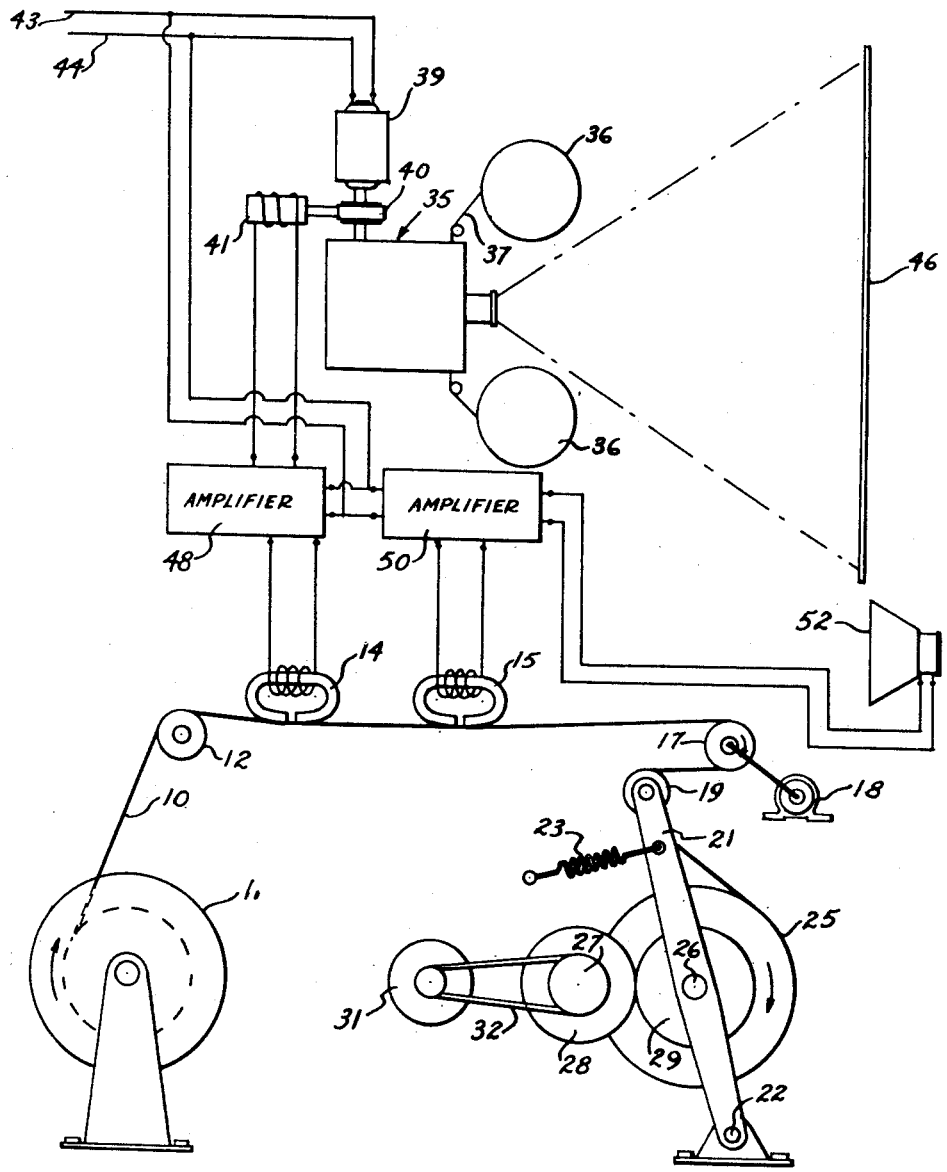
INVENTOR.
Fred Waller
BY Emery, Varney,
Whittemore & Dix.

Patented Apr. 4, 1950

2,503,083

UNITED STATES PATENT OFFICE 2,503,083

APPARATUS FOR CONTROLLING PICTURE DISPLAYS FROM SOUND RECORDS

Fred Waller, Huntington, N. Y., assignor to The Vitarama Corporation, Huntington Station, N. Y., a corporation of New York Application February 15, 1947, Serial No. 728,856

4 Claims. (Cl. 88—16.2)

This invention relates to apparatus for reproducing sound with pictures or other displays shown in a predetermined sequence and in any desired time relation with the sound.

In the case of talking motion pictures the speed at which the film travels is dependent upon optical considerations such as the avoiding of flicker and jumping motion in the action portrayed. Sound tracks are placed on films with the motion pictures and run necessarily at the speed of the film.

It is an object of this invention to provide sound reproduction which is accompanied by displays but which is in no way dependent upon the rate at which one display follows another in sequence. Sound recorded and reproduced in accordance with this invention can be used with lantern slides arranged in sequence on a link chain, or with motion picture film that is either run at standard projection rates or used as lantern slides, or run part of the time at standard projection rates and part of the time at a slow rate that uses the successive frames of the film for the same purpose as slides on a link chain.

The change from one display to the next is controlled by signals on a record, preferably on the same record with the sound though not necessarily superimposed on the sound signals. The spacing of the control signals along the record is ordinarily not uniform, except with motion pictures, because there are longer sound recordings to be reproduced with some of the displays than with others.

When the control signals are superimposed on the recorded sound, the frequency used for the control signals must be beyond the range of the audio frequency used for the speaker that reproduces the sound. The control signal frequency can be either above or below the range of frequencies used for the speaker.

The invention is particularly useful for educational or advertising displays with which considerable explanation by recorded sound may be desirable for each display. It is especially advantageous for training courses where explanations must accompany some pictures, and where other pictures follow one another in sufficiently rapid succession to illustrate the motion of a subject.

Other objects, features, and advantages of the invention will appear or be pointed out as the description proceeds.

In the drawing the single figure is a diagrammatic illustration of apparatus embodying the invention.

A record 10, comprising a magnetic tape, is wound on a roll 11 and is fed around an idler pulley 12, under pick-up generators 14 and 15, and around a driving pulley 17 that is rotated at constant speed, by a motor 18, for moving the record 10 under the pick-up generators at a uniform rate.

After passing around the driving pulley 17, the record travels around a slack take-up roll 19 that leads the record back from the driving pulley 17 so as to obtain a substantial angle of friction contact between the record and the driving pulley for preventing slippage that would interfere with the uniformity of the record speed.

The take-up roll 19 is carried on the upper end of a lever 21 which is pivotally supported by a fulcrum pin 22. A spring 23 urges the lever 21 and take-up roll 19 away from the driving pulley 17 to maintain some tension on the record. The record winds up on a spool or roll 25 that rotates on an axle 26 supported by the lever 21. This roll 25 is driven from a pulley 27 through friction driving elements 28 and 29. A motor 31 drives the pulley 27 by means of a belt 32.

The record 10 is preferably a paper tape with a plastic coating in which iron particles are embedded. Such tapes are very efficient as sound records. The particles are selectively magnetized by passing the tape under electromagnetic devices 14 and 15 while current is supplied to these devices and modulated in accordance with the signals that it is desired to record. The record is reproduced by using the devices 14 and 15 as pick-up generators. As the magnetized record passes under the pick-up generators 14 and 15, the selective magnetism of the iron particles generates minute currents in the windings of the pick-up generators. These currents are the magnetic signals of the record converted into electrical impulses by the pick-up generators 14 and 15. The impulses are amplified to obtain enough power to operate a speaker or control apparatus.

The record 10 is merely representative of records on which signals of desired frequencies can be recorded. Various known types of records can be used for this invention. Magnetic wires are one type; and paper tapes with alternating light and dark lines can be used. Such paper tapes require photo-cell equipment to convert the signals to electrical impulses, and they have the disadvantage that entirely different equipment is required for recording than for reproducing. The record may be made on a disc, or on motion picture film in the manner employed for talking pictures, but it is a feature of the invention that the record is separate from the pictures that the record is used with, and that the displayed pictures are changed in accordance with control signals on the record.

The picture display device shown in the drawing is a motion picture projector 35 with spools 36 on which a picture film 37 is wound. The projector 35 is driven by a motor 39 through a one-turn clutch 40 equipped with an operating solenoid 41. The motor 39 is connected with a power line comprising conductors 43 and 44; and this motor rotates continuously during operation of the apparatus. Whenever the solenoid 41 is energized, it causes the clutch 40 to engage and rotate the connected mechanism of the projector through one revolution. This movement shifts the film 37 for a distance of one frame and thereby brings the next picture on the film into position to be displayed by protection on a screen 46.

After one turn, the clutch 40 disengages again unless the solenoid 41 is immediately energized again or has been kept energized while the clutch 40 is operating. The projector 35 operates, therefore, by moving the film 37 one frame at a time, with a dwell between movements equal to the time between successive operations of the solenoid 41; or the projector 35 operates steadily in the conventional manner to produce a motion picture on the screen 46, if the solenoid is energized continuously or frequently enough to keep the clutch 40 from disengaging.

Motion picture film made for single frame movement for part of the film, and for continuous operation of other parts of the film, may not be exposed in the conventional manner. The frames that are to be projected individually for substantial periods are used as lantern slides, that is, each frame is a separate scene. The other portions of the film that are operated with frames projected in rapid succession to produce the illusion of motion are made in the usual manner.

The one turn clutch 40, for obtaining operation of the picture changing mechanism of the projector 35, is a well known mechanical expedient. Other expedients can be used and the clutch 40 is merely representative of mechanism for causing the picture changing mechanism to bring the next successive picture into position for continued display awaiting operation of a control circuit before initiating the next cycle of operation of the picture changing mechanism.

The solenoid 41 is part of a control circuit that includes the pick-up generator 14 and an amplifier unit 48 that increases the strength of control signals to obtain sufficient power to operate the solenoid 41. The control signals on the record 10 are spaced as far apart as necessary to obtain the desired display time for each of the individual pictures of the series contained on the film 37.

Sound signals recorded on the tape 10 are converted into electrical impulses by the pick-up generator 15 and these impulses are amplified in an amplifier unit 50 to operate a speaker 52 located adjacent the screen. In a combination having separate pick-up generators 14 and 15 for the control signals and sound signals respectively, the signals for control and sound can be located along different and parallel tracks on the record 10.

If the control signals are superimposed on the sound signals, separate pick-up generators 14 and 15 can still be used, or a single pick-up generator can be used for both the control and speaker circuits. With a single pick-up generator, however, it is necessary to have filters in the circuits for separating the unwanted frequencies for each circuit, or to have apparatus in the circuits that will not respond to unwanted frequencies that do reach them. Control signals superimposed on the sound signals must have frequencies beyond the audio range used for the speaker. A 30 cycle control signal is suitable.

The method of this invention includes recording on the record the sound which is to be reproduced while the first picture of a series is displayed, and recording a control signal at the location on the record corresponding to the time in the sound reproduction where it is desired to display the next successive picture. The sound that is to be accompanied by the second picture is recorded on the record beyond the first control signal, and another control signal is recorded at the place on the sound record when the next picture is to be displayed, and so on for the entire series of picture. When the sound record is reproduced, the picture changes occur at any desired regular or irregular spacing in accordance with the position at which control signals have been recorded on the sound record. The sound reproduction can continue without interruption during the control signals and while the picture change mechanism is in operation.

One embodiment of the invention has been illustrated and described, but changes and modifications can be made and some features can be used in different combinations without departing from the invention as defined in the claims.

I claim as my invention:

1. Apparatus for reproducing sound accompanied by pictures, said apparatus including a motion picture projector, mechanism for moving a film through the projector with intermittent motion, a continuously operating motor, a one-turn clutch through which the motor drives the film moving mechanism of the projector, said one-turn clutch being constructed and arranged to disengage at the end of each intermittent motion of the film, an electrical control device for keeping the clutch engaged, a sound record independent of the film and having sound signals and control signals thereon, an electrical device responsive to the control signals for supplying energy to said electrical control device that keeps the clutch engaged.

2. Apparatus for reproducing sound accompanied by pictures, said apparatus including a motion picture projector, mechanism for moving the film through the projector with intermittent motion, a continuously operating motor, clutch means through which the motor drives the film moving mechanism of the projector, said clutch means being constructed and arranged to disengage at the end of a predetermined movement of the film, an electrical control device for preventing disengagement of the clutch means, a sound record independent of the film and having sound signals and control signals thereon, and an electrical device responsive to the control signals for supplying energy to said electrical control device.

3. Apparatus for controlling picture displays from a sound record, said apparatus comprising a motion picture projector, a motor, mechanism for moving a film through the projector with intermittent motion, clutch means movable into different positions in which it selectively connects and disconnects the motor and said mechanism, through which power from the motor is transmitted to said mechanism, the clutch means being constructed and arranged to disengage at the end of a predetermined movement of the clutch means by the motor, an electrical control device that causes engagement of the clutch and that prevents the clutch from disengaging, a sound record independent of the film and having sound signals and control signals thereon, and an electrical device responsive to the control signals for supplying energy to said electrical control device that engages the clutch and that prevents the clutch from disengaging.

4. Apparatus for controlling picture displays from a sound record including a motion picture projector, mechanism for moving a film through the projector with intermittent motion, a motor for supplying power to said mechanism, a one-turn clutch through which the motor drives the film moving mechanism, said one-turn clutch being correlated with the film moving mechanism so as to disengage after a film frame has been moved into position for projection, an electrical control device for preventing disengagement of the one-turn clutch, a sound record independent of the film and having sound signals and control signals thereon, and an electrical device responsive to the control signals for supplying energy to said electrical control device.

FRED WALLER.

REFERENCES CITED

The following references are of record in the file of this patent:

UNITED STATES PATENTS

| Number | Name | Date |
|---|---|---|
| 1,826,786 | Hopkins | Oct. 13, 1931 |
| 1,859,665 | Golden et al. | May 24, 1932 |
| 1,866,712 | Jones | July 12, 1932 |
| 1,987,544 | Wood et al. | Jan. 8, 1935 |
| 2,096,020 | Adair et al. | Oct. 19, 1937 |
| 2,116,314 | Jenkins et al. | May 3, 1938 |
| 2,141,203 | Abbott | Dec. 27, 1938 |
| 2,281,943 | Loughner et al. | May 5, 1942 |

FOREIGN PATENTS

| Number | Country | Date |
|---|---|---|
| 354,170 | Great Britain | July 27, 1931 |